United States Patent Office

3,565,845
Patented Feb. 23, 1971

3,565,845
SILOXANE - POLYOXYALKYLENE BLOCK COPOLYMERS CONTAINING METHOXYSILOXY GROUPS
Gordon C. Johnson, Katonah, N.Y., assignor to Union Carbide Corporation, New York, N.Y., a corporation of New York
No Drawing. Filed Sept. 18, 1968, Ser. No. 760,720
Int. Cl. C08g *31/02, 47/02*
U.S. Cl. 260—29.2                                 6 Claims

ABSTRACT OF THE DISCLOSURE

This invention relates to novel siloxane-polyoxyalkylene block copolymers containing methoxysiloxy groups. The novel block copolymers are particularly useful in the treatment of fibrous materials (e.g., synthetic or natural organic textile fibers or fibrous glass) to improve the properties (e.g., soil release) of the fibrous materials.

---

The treatment of fibrous materials with organosilicon compounds in order to improve the properties of the fibrous materials is well known in the art. By way of illustration, it has been proposed that siloxane-polyoxyalkylene block copolymers can be applied to fibrous glass and organic textiles in order to enhance such properties as lubricity and resistance to the accumulation of static electricity.

Methods of treating fibrous materials with siloxane-polyoxyalkylene block copolymers proposed to date have suffered from certain drawbacks attributable to the nature of the particular siloxane-polyoxyalkylene block copolymer employed. Thus, in certain of these block copolymers, the siloxane block is linked to the polyoxyalkylene by a silicon to oxygen bond which is subject to hydrolysis in the aqueous baths often used in applying the block copolymers to fibrous materials. Such block copolymers are also prone to hydrolysis when fibrous materials coated therewith are exposed to water, especially under non-neutral conditions (e.g., when the fibrous material is washed with an alkaline detergent solution). Further, most siloxane-polyoxyalkylene block copolymers proposed for treatment of fibrous materials are free of reactive sites and such block copolymers have been found to produce coatings on fibrous materials lacking in durability. That is, the coatings are removed when the fibrous materials are subjected to repeated washings.

It has been disclosed that siloxane-polyoxyalkylene block copolymers having SiH groups have good durability to washing when coated on fibrous materials. Apparently, the SiH groups are reactive and provide sites for bonding the block copolymers to the fibrous materials or for cross-linking the block copolymers to encapsulate the fibers of the fibrous materials. Although durable coatings can be produced on fibrous materials with such block copolymers, the block copolymers are not entirely satisfactory in fiber treating applications as the SiH groups therein impart limited storage stability to aqueous fiber treating baths containing the block copolymers. Further, when significant amounts of polyoxypropylene groups or higher polyoxyalkylene groups are present in such block copolymers, or in other known fiber treating siloxane-polyoxyalkylene block copolymers, the block copolymers are not as soluble in water as may be desired and also impart poor soil release characteristics to fibrous materials coated therewith.

It is an object of this invention to provide siloxane-polyoxyalkylene block copolymers that achieve improved results when used in treating fibrous materials.

It is another object of this invention to provide siloxane-polyoxyalkylene block copolymers capable of forming durable coatings on fibrous materials.

It is a further object of this invention to provide siloxane-polyoxyalkylene block copolymers capable of forming relatively storage stable aqueous fiber-treating solutions.

It is a still further object of this invention to provide siloxane-polyoxyalkylene block copolymers which impart soil release properties to fibrous materials treated therewith.

Other objects of this invention will be apparent from the following description thereof.

This invention provides novel siloxane-polyoxyalkylene block copolymers containing groups represented by the formula:

wherein $a$ has a value of 1, 2 or 3, and each R is a monovalent hydrocarbon group, a methoxy group or a divalent organic group that links the silicon atom in Formula 1 to a polyoxyalkylene chain and that is bonded to the silicon atom in Formula 1 by a carbon to silicon bond; provided that the copolymer contains an average of at least 0.05 such methoxy group per silicon atom, that the copolymer contains at least one such divalent organic group and at least one such methoxy group per molecule, that at least 75 mol percent of the oxyalkylene groups in the polyoxyalkylene chains are oxyethylene groups and that the copolymer contains an average of less than 0.02 silicon-bonded hydrogen atom per silicon atom.

Preferably, the polyoxyalkylene chain or chains constitute from 30 to 85 weight percent of the copolymer and the copolymer contains an average of less than 0.01 silicon-bonded hydrogen atom per silicon atom. Preferably the block copolymer contains silicon-bonded methoxy groups and silicon atoms in a ratio of from 2:10 to 8:10 inclusive and from 90 to 100 mol percent of the oxyalkylene group in the polyoxyalkylene chain are oxyethylene groups. Preferably the molecular weight of the block copolymer is from 5,000 to 20,000. The block copolymers are preferably soluble in water (e.g. at least to the extent of 1 part by weight of the copolymer per 100 parts by weight of water).

Typical of the monovalent hydrocarbon groups represented by R in Formula 1 above are the alkyl groups (e.g., the methyl, ethyl, propyl, butyl and pentyl groups), the aryl groups (e.g., the phenyl, and naphthyl groups), the aralkyl groups (e.g., the benzyl and beta-phenyl ethyl groups), the linear alkenyl groups (e.g., the vinyl, alkyl and butenyl groups) and the cycloalkenyl groups (e.g., the cyclopentenyl and cyclohexyl groups). Preferably, the monovalent hydrocarbon group represented by R in Formula 1 is a methyl group.

The structure of the divalent organic group represented by R in Formula 1 is usually governed by the type of reaction involved in producing the siloxane-polyoxyalkylene block copolymer. Such copolymers can be produced by any number of known reactions thereby giving rise to a variety of divalent organic groups linking the siloxane portion to the oxyalkylene portion of the copolymer. Typical of such known reactions are the following:

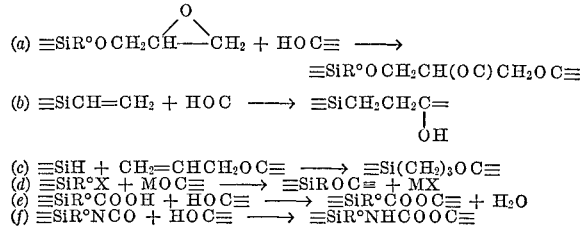

In the above Equations a to f, group, X represents a halogen atom (i.e., bromine, chlorine, fluorine, or iodine), M is an alkali metal such as sodium or potassium, and R° is a divalent hydrocarbon radical. In the Equations a through f, the Si-containing group on the far left represents the reactive portion of the siloxane reactant while the group immediately to the left of the arrow represents reactive portion of the polyoxyalkylene reactant.

Illustrative of the divalent organic groups represented by R in Formula 1 and R° in Formulas a to f are the alkylene groups (such as methylene, ethylene, propylene, butylene, 2,2-dimethyl - 1,3 - propylene and decylene groups), the arylene groups (such as the phenylene and p,p-diphenylene groups), and the aralkarylene groups (such as the phenylethylene group). Preferably, the divalent organic group is an alkylene group containing from two to four successive carbon atoms. Siloxane groups containing divalent organic groups as substituents are illustrated by groups having the formulae:

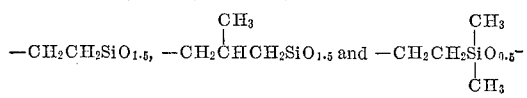

These organic hydrocarbon groups are linked to a silicon atom of the siloxane chain or block of the copolymer by a silicon-to-carbon bond and to an oxygen atom of the oxyalkylene chain of the copolymer by a carbon-to-oxygen bond.

The block copolymers of this invention can contain siloxane groups represented by Formula 1 wherein either the same groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups). These copolymers can contain one or more types of siloxane groups that are represented by Formula 1 provided that at least one group has at least one divalent hydrocarbon substituent and at least one group has at least one methoxy substituent. By way of illustration, only ethylenemethyloxysiloxy group,

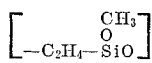

can be present in the siloxane block or the copolymer can contain more than one type of siloxane group, e.g., the copolymer can contain both ethylenemethyloxysiloxy groups and diphenylsiloxy groups, or the copolymer can contain ethylenemethyloxysiloxy groups, diphenylsiloxy groups and the diethylsiloxy groups. The copolymers useful in this invention can contain trifunctional siloxane groups (e.g., monomethylsiloxane groups, $CH_3SiO_{1.5}$), difunctional siloxane groups (e.g., dimethylsiloxane groups, $(CH_3)_2SiO$—), monofunctional siloxane groups (e.g., trimethylsiloxane groups, $(CH_3SiO_{0.5})$), or combination of these types of siloxane groups having the same or different substituents. Due to the functionality of the siloxane groups, the copolymer can be predominantly linear or cyclic or crosslinked or it can have combinations of these structures.

The siloxane portion of the block copolymers of this invention can contain end-blocking or chain terminating organic groups, other than the chain terminating groups encompassed by Formula 1. By way of illustration, the siloxane portion can contain such silicon-bonded end-blocking groups as the hydroxyl group, the aryloxy groups (such as the phenoxy group), the alkoxy groups (such as the ethoxy, propoxy and butoxy groups), the acyloxy groups (such as the acetoxy group) and the like.

Typical of the polyoxyalkylene chains linked to the silicon atom in Formula 1 by the divalent organic group represented by R are those having the formula:

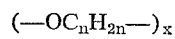 (2)

wherein $n$ has a value of at least 2 and $x$ has a value of at least 5, provided at least 75 mol percent of the —$OC_nH_{2n}$— groups are —$OC_2H_4$— groups. Chains represented by Formula 2 include homopolymeric chains containing only oxyethylene groups and copolymeric chains containing both oxyethylene groups and other oxyalkylene groups (e.g., 1,2-oxypropylene, 1,2-oxybutylene, and the like).

The polyoxyalkylene chains in the block copolymers of this invention can be end-blocked in any of a variety of ways. By way of illustration, the polyoxyalkylene chains can be end-blocked with another divalent organic group represented by R, a hydroxyl group, a hydrocarbonoxy (—OR), an acyloxy group, a trihydrocarbylsiloxane group, etc.

Preferred block copolymers of this invention are composed of the following groups:

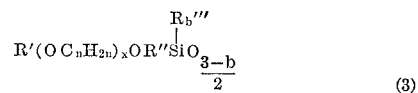 (3)

 (4)

and

 (5)

wherein R' is hydrogen or R''', R''' is a monovalent hydrocarbon group as defined for R in Formula 1 above, R'' is an alkylene group containing at least two carbon atoms, $n$ and $x$ have the above defined meanings, $b$ and $c$ have values of 0, 1 or 2 and $d$ has a value of 1, 2 or 3.

Especially preferred block copolymers of this invention are those represented by the average formula:

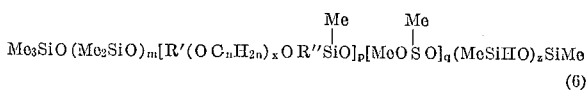

(6)

wherein Me is a methyl group, $m$ has a value from 0 to 100, $(p+q)$ has a value from 10 to 100 inclusive, $p$ is a positive number having value for $0.15(p+q)$ to $0.8(p+q)$, $q$ is a positive number, $z$ has a value less than 0.01 and R', R'', $n$ and $x$ have the above-defined meanings.

Of course, the block copolymers represented by Formula 6 above and the block copolymers composed of groups represented by Formulas 3, 4 and 5 above have the critical minimum methoxy to silicon ratio, minimum oxyethylene content and maximum silanic hydrogen content set out in connection with Formula 1 above.

The siloxane-oxyalkylene block copolymers of this invention are readily prepared by sequentially reacting a siloxane with a precursor for the polyoxyalkylene chain and a precursor for the methoxy groups in accordance with any of the well known processes for attaching polyoxyalkylene chains and methoxy groups to silicon atoms. For example, a siloxane containing SiH groups can be reacted with a stoichiometric insufficiency of an alkenyl-end-blocked polyoxyalkylene polymer in the presence of a platinum catalyst to produce a siloxane-polyoxyalkylene block copolymer containing SiH groups. The copolymer so produced can be then reacted with methanol to convert the remaining SiH groups to Si-methoxy groups so as to produce a block copolymer of this invention. Chloroplatinic acid in an amount that provides from 0.003 to 0.008 part by weight of platinum per 100 parts by weight of the reactants is a suitable catalyst for both of the foregoing reactions. Reference is also made to the various other well known methods for attaching polyoxyalkylene chains and methoxy groups to siloxanes. Such methods are generally applicable to the production of the block copolymers of this invention.

The block copolymers of this invention can obviously be modified in a variety of known ways to modify the structure thereof. By way of illustration, siloxane groups other than those disclosed above (e.g. halohydrocarbylsiloxane groups) can be incorporated into the block copolymers or into the siloxane reactants from which they are produced by known methods (e.g. by equilibration).

The block copolymers of this invention can be discrete chemical compounds. Usually, however, the block copolymers are mixtures of various discrete block copolymeric species. The block copolymers are usually mixtures due, at least in part, to the fact that the siloxane and polyoxyalkylene reactants used to produce the block copolymers are themselves usually mixtures.

A process for treating fibrous materials with the siloxane-polyoxyalkylene block copolymers of this invention is disclosed and claimed in copending application Ser. No. 760,735, entitled "Treatment of Fibers With Siloxane-Polyoxyalkylene Block Copolymers Containing Methoxysiloxy Groups" filed concurrently herewith in the name of Gordon C. Johnson. This process is summarized below.

Any of a wide variety of fibrous materials can be treated with the siloxane-polyoxyalkylene block copolymers of this invention in accordance with the process of said application Ser. No. 760,735. Included among such fibrous materials are fibrous glass and organic fibers such as vinyl halide, vinylidene halide, polyamide, acylic, polyester, polyurethane, polyolefins, and cellulosic fibers. The fibrous material can be in any of a variety of forms (e.g., single filaments, rovings, yarns, mats or cloth). Blends of two or more types of fibers can be treated.

Fibrous materials can be treated with the block copolymers in any of a variety of ways. Thus, the fibrous material can be immersed in a solution containing the copolymer. Then excess solution can be removed from the fibrous material by padding. The copolymer is cured on the fibrous material by any suitable means. Preferably, curing of the copolymer is accomplished by heating the treated fibrous material at a temperature from 120° C. to 175° C. If desired, a curing catalyst for the copolymer can be applied to the fibrous material before curing the copolymer (preferably as a component of the treating solution or dispersion containing the copolymer). Preferred catalysts include acid salts such as $MgCl_2$, $ZnNO_3$ and $ZnCl_2$. In general, any known catalyst for the hydrolysis of SiOMe groups can be used. Suitable treating solutions or dispersions (baths) can contain a diluent and from 0.1 to 10 parts by weight per 100 parts by weight of the diluent of a siloxane-polyoxyalkylene copolymer as defined above. Suitable diluents include water, aqueous solvents, alcohols, glycols, glycol ethers, hydrocarbons, halohydrocarbons, and ketones.

The amount of the block copolymer applied to the fibrous material (the "add-on") can vary widely depending on such factors as the desired properties of the final product, economic considerations, compatibility factors, etc. Generally, it is desired that from 1 to 6 parts by weight of the copolymer per 100 parts by weight of the fibrous material be applied. Preferably from 2 to 4 parts by weight of the copolymer per 100 parts by weight of the fibrous material be applied. Add on is measured after the fibrous material has been treated with the copolymer and any volatile materials removed.

A preferred application of the block copolymers of this invention involves treating a hydrophobic fibrous textile material with the copolymer. Such hydrophobic materials include those in which the fibers are formed from hydrophobic polymers (e.g. polyesters) and textile materials in which the fibers have been coated with a hydrophobic substance (e.g., certain creaseproofing agents). The soil release of such textiles (e.g. textiles composed of polyester fibers alone or blended with hydrophilic fibers such as cellulosic fibers) is remarkably increased by such treatment. It is often desirable to treat the textile material containing hydrophobic fibers with a creaseproofing agent as well as soil release properties, to the fibrous material. Such creaseproofing agents (or durable press agents) are well known materials and include aminoplast resins, epoxides, aldehyde derivatives, sulfones and sulfoxides. Suitable creaseproofing agents are disclosed in "Creaseproofing Agents for Wash-and-Wear Finishing" by A. C. Nuessle, Textile Industries, October 1959, pages 1 to 12.

When both a siloxane-polyoxyalkylene copolymer and a creaseproofing agent are employed to treat hydrophobic fibrous textile materials in accordance with the process of this invention, a cure catalyst for the creaseproofing agent is generally employed. The choice of the catalyst is governed by the particular creaseproofing agent. By way of illustration, catalysts, such as magnesium chloride, zinc chloride, zinc nitrate, and amine hydrochlorides which can be used with aminoplast resins; catalysts such as zinc fluoborate can be used with epoxides; catalysts such as hydrochloric acid can be used with aldehydes; alkaline catalyst can be used with aldehyde derivatives; and catalysts such as sodium hydroxide can be used with sulfones. The cure of the creaseproofing agent is usually effected at an elevated temperature (e.g., from 150° C. to 175° C.). Certain of the creaseproofing agents, particularly those aminoplast resins that contain olefinic unsaturation, can be cured by radiation.

The creaseproofing agent can be applied to the fibrous material by any of the techniques described above for application of the copolymer to the material (e.g., immersion, etc.).

The siloxane-polyoxyalkylene copolymers of this invention are superior to various other siloxane-polyoxyalkylene copolymers in connection with the treatment of fibrous materials. Thus, the copolymers are more durable when applied to fibrous materials than prior copolymers free of reactive groups. Further, aqueous treating baths containing the copolymers of this invention have greater storage stability than those baths containing prior copolymers having substantial amounts of SiH groups. Still further, the copolymers of this invention impart greater tear strength and sometimes greater soil release than otherwise similar copolymers containing ethoxysiloxy groups rather than methoxysiloxy groups. Additionally, the copolymers of this invention impart better soil release properties to fibrous materials than prior siloxane - polyoxyalkylene block copolymers wherein the polyoxyalkylene block is composed solely or predominantly of oxypropylene groups. As compared to other soil release agents used in connection with creaseproofing agents, particularly as compared to the acrylic acid polymer soil release agents widely used commercially in conjunction with aminoplast creaseproofing agents, the copolymers of this invention impart improved hand to the treated textile material.

Fibrous materials treated with the block copolymers of this invention can be employed in the usual areas of use for such materials. Thus the treated fibrous materials can be converted to drapes, clothing, upholstery, etc.

The block copolymers of this invention can be employed as foam stabilizers in the production of polyurethane foams as disclosed in British patent specification 1,015,611. Additionally, the block copolymers can be employed as metal lubricants.

The following examples illustrate the present invention.

In the following examples, the abbreviations indicated below are used:

| Abbreviation | Meaning |
|---|---|
| Me | Methyl |
| g. | grams |
| ml. | Milliliters |
| cc. | Cubic centimeter |

EXAMPLE I

The reactants and solvents used in this example were substantially anhydrous. Fifty grams of a siloxane having the average formula:

$$\text{Me}_3\text{SiO}(\overset{\overset{\displaystyle \text{Me}}{|}}{\text{H}}\text{SiO})_{40}\text{SiMe}_3$$

was refluxed with 250 ml. benzene in a 500 ml. 3 neck flask equipped with stirrer, thermometer, addition funnel, Dean-Stark trap and head condenser to remove any traces of water. A solution of (1.5 cc.) of $H_2PtCl_6$ dissolved $MeOCH_2CH_2OMe$ containing 0.0036 g. platinum per cc. was mixed with 5 drops of an allyl end-blocked polyoxyalkylene polymer having the average formula:

$$CH_2=CHCH_2(OC_2H_4)_7OMe$$

and added to the dried solution. An additional 50 g. of the polyoxyalkylene polymer containing 1.5 cc. of the $H_2PtCl_6$ solution was then slowly added to the refluxing solution. After all the polyoxyalkylene polymer was added, the solution was refluxed one hour under nitrogen. The solution was cooled to 60° C. and 30 ml. absolute methanol was added from the addition funnel. The solution was refluxed one hour at the boiling point of the benzene/MeOH azeotrope. The azeotrope was then distilled and the solution volume replenished with fresh methanol. 300 ml. of the azeotrope was collected leaving a methanol-rich solution. The solution was then stripped of volatile materials by heating at reduced pressure to 120° C. Product was transferred to a 500 ml. round bottom flask and volatile materials (mostly methanol) was distilled under vacuum. The product was a light yellow fluid. The product had a viscosity of 187 cst. at 20° C. The product was a block copolymer that had the average formula:

$$\text{Me}_3\text{SiO}[\text{Me}(\text{OC}_2\text{H}_4)_7\text{C}_3\text{H}_6\overset{\overset{\displaystyle \text{Me}}{|}}{\text{Si}}\text{O}]_8[\text{MeO}\overset{\overset{\displaystyle \text{Me}}{|}}{\text{Si}}\text{O}]_{32}(\text{MeSiHO})_{0.1}\text{SiMe}_3$$

The latter copolymer is referred to hereinafter as "Copolymer I."

EXAMPLE II

Following the general procedure of Example I above, allyl end-blocked polyoxyalkylene polymers were reacted with an excess of siloxanes containing silanic hydrogen and the products so produced were then reacted with methanol to reproduce block copolymers useful in this invention having the average formula:

$$\text{Me}_3\text{SiO}[\text{Me}(\text{OC}_2\text{H}_4)_r\text{OC}_3\text{H}_6\overset{\overset{\displaystyle \text{Me}}{|}}{\text{Si}}\text{O}]_u[\text{MeO}\overset{\overset{\displaystyle \text{Me}}{|}}{\text{Si}}\text{O}]_v(\text{MeSiHO})_w\text{SiMe}_3 \quad (A)$$

These copolymers are referred to hereinafter as "Copolymers II to V" and their specific compositions are indicated below:

VALUE OF SUBSCRIPTS IN FORMULA A

| Copolymer | r | u | v | w | Wt. percent siloxane |
|---|---|---|---|---|---|
| II | 15 | 8 | 32 | 0.2 | 29 |
| III [2] | 34 | 8 | 32 | <1.0 | 25 |
| IV [1] | 7 | 16 | 24 | 0.4 | 40 |
| V [2] | 7 | 24 | 16 | 0.1 | 31 |

[1] Viscous liquid.  [2] Waxy solid.

Copolymers I to V were soluble at 10 percent by weight concentration in water.

What is claimed is:

1. A siloxane-polyoxyalkylene block copolymer consisting essentially of the following groups:

$$R'(OC_nH_{2n})_xOR''\overset{\overset{\displaystyle R_b'''}{|}}{\text{Si}}O_{\frac{3-b}{2}}$$

$$CH_3O\overset{\overset{\displaystyle R_c'''}{|}}{\text{Si}}O_{\frac{3-c}{2}}$$

and $$R_d'''SiO_{\frac{4-d}{2}}$$

wherein R′ is a hydrogen or a monovalent hydrocarbon group, R″ is an alkylene group containing at least two carbon atoms, R‴ is a monovalent hydrocarbon group, n has a value of at least 2, x has a value of at least 5, b has a value of 0, 1 or 2, c has a value of 1, and d has a value of 1, 2 or 3, and wherein the copolymer contains an average of at least 0.05 methoxy groups per silicon atom in the copolymer, and at least 75 mol percent of the oxyalkylene groups in the polyoxyalkylene chains are oxyethylene groups, and wherein the copolymer contains an average of less than 0.02 silicon-bonded hydrogen atoms per silicon atom.

2. A block copolymer as defined in claim 1 wherein the block copolymer contains less than 0.01 silicon-bonded hydrogen atom per silicon atom.

3. A block copolymer as defined in claim 1 wherein the block copolymer contains silicon-bonded methoxy groups and silicon atoms in a ratio of from 2:10 to 8:10 inclusive.

4. A block copolymer as defined in claim 1 wherein each oxyalkylene group in each polyoxyalkylene chain is an oxyethylene group.

5. A block copolymer as defined in claim 1 represented by the average formula:

$$\text{Me}_3\text{SiO}(\text{Me}_2\text{SiO})_m[R'(\text{OC}_nH_{2n})_xOR''\overset{\overset{\displaystyle \text{Me}}{|}}{\text{Si}}O]_p\text{MeO}\overset{\overset{\displaystyle \text{Me}}{|}}{\text{Si}}O]_q(\text{MeSiHO})_z\text{SiMe}_3$$

wherein Me is a methyl group, m has a value from 0 to 100, (p+q) has a value from 10 to 100 inclusive p is a positive number having a value for 0.15 (p+q) to 0.8 (p+q), q is a positive number, z has a value less than 0.01 and R′, R″, n and x have the meanings given in claim 1.

6. An aqueous solution containing from 0.1 to 10 parts by weight of a block copolymer as defined in claim 1 per 100 parts by weight of the aqueous liquid.

References Cited
UNITED STATES PATENTS

| | | | |
|---|---|---|---|
| 3,271,331 | 9/1966 | Ender | 260—2.5 |
| 3,342,766 | 9/1967 | Huntington | 260—824 |
| 3,384,599 | 5/1968 | Omietanski et al. | 260—824 |
| 3,457,173 | 7/1969 | Pater | 260—448.2 |

SAMUEL H. BLECH, Primary Examiner

U.S. Cl. X.R.

117—126, 138.8, 139.5, 143; 252—49.6; 260—2.5, 32.8, 33.2, 33.4, 33.6, 33.8, 46.5, 448.2, 448.8, 824, 826